E. F. WILLMANN AND W. KUERSTEN.
EGG CRATE.
APPLICATION FILED JULY 25, 1921.
1,430,205.
Patented Sept. 26, 1922.
2 SHEETS—SHEET 1.
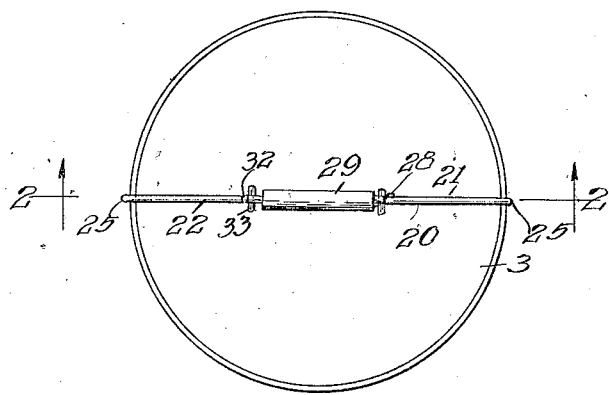
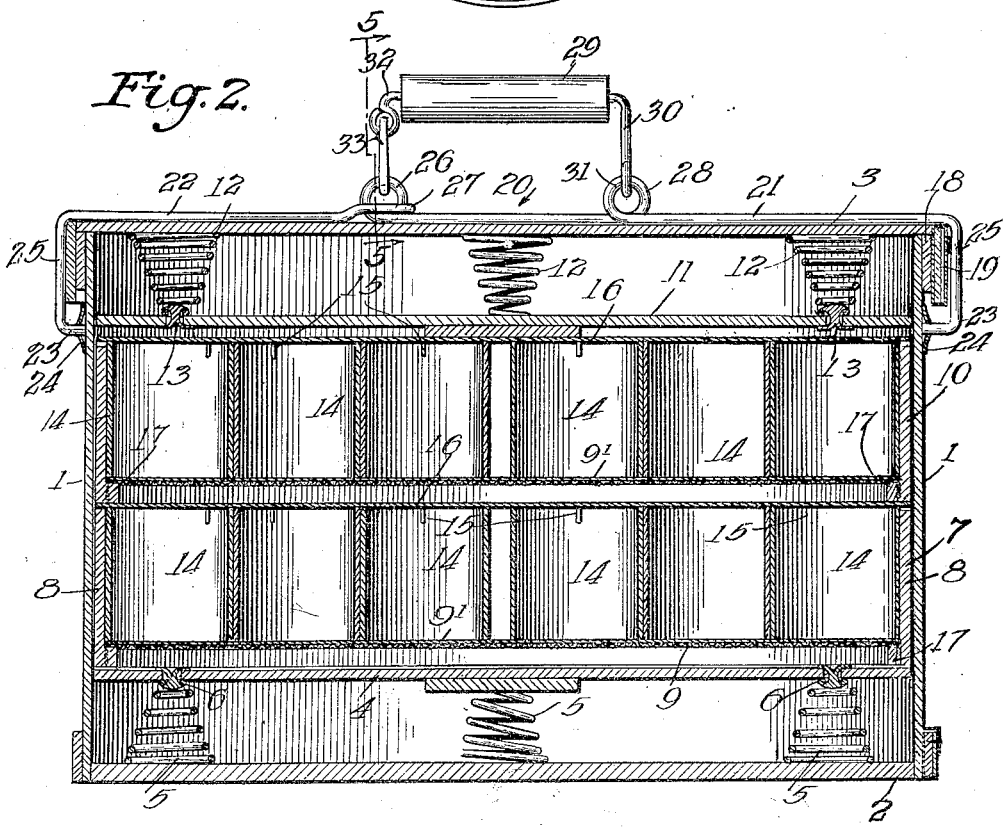

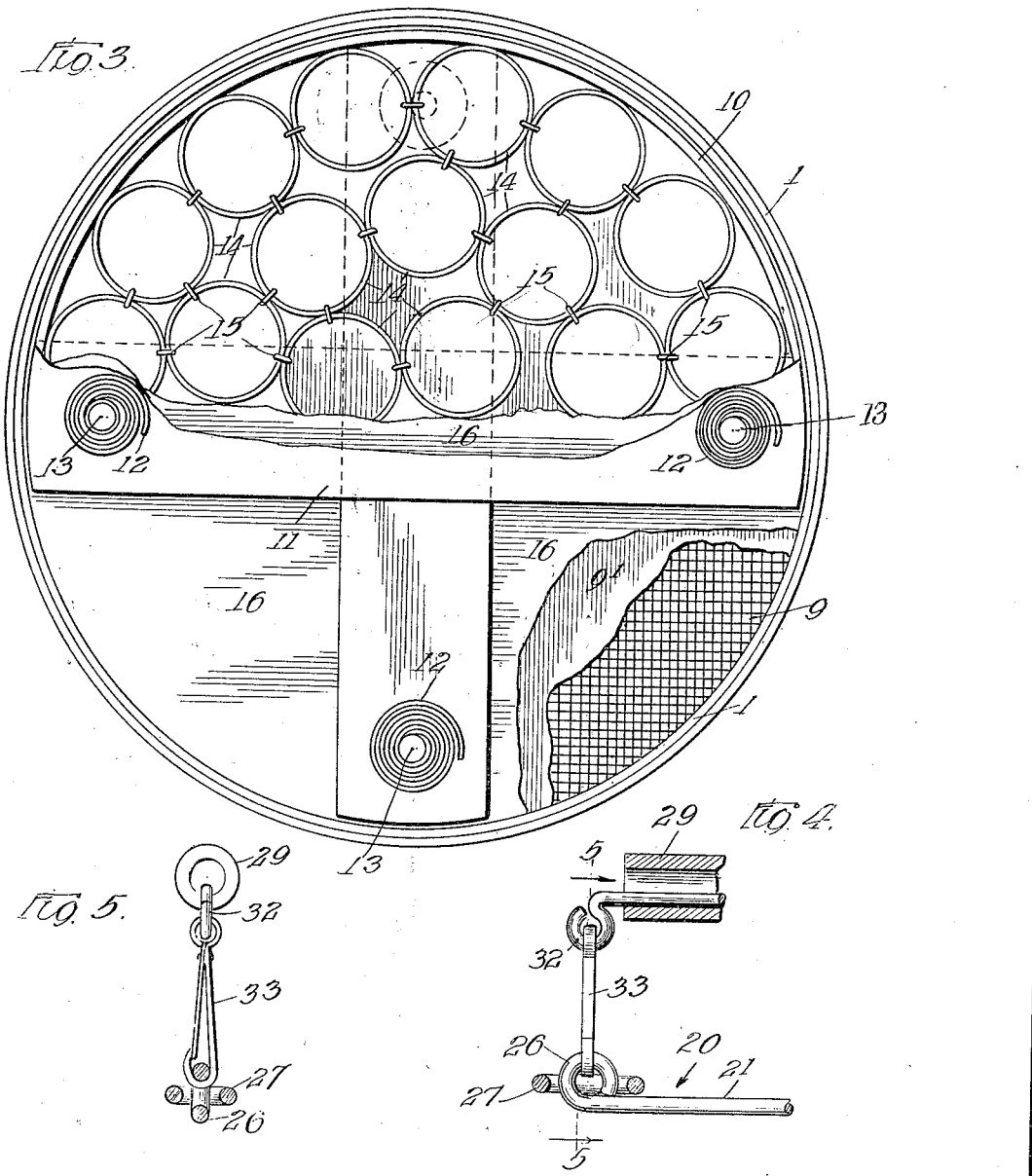

Patented Sept. 26, 1922.

1,430,205

UNITED STATES PATENT OFFICE.

ERNEST F. WILLMANN, OF PALATINE, AND WILLIAM KUERSTEN, OF CHICAGO, ILLINOIS.

EGG CRATE.

Application filed July 25, 1921. Serial No. 487,408.

*To all whom it may concern:*

Be it known that we, ERNEST F. WILLMANN and WILLIAM KUERSTEN, citizens of the United States, and residents of Palatine and Chicago, respectively, in the county of Cook and State of Illinois, have invented certain new and useful Improvements in an Egg Crate, of which the following is a specification.

Our invention relates to improvements in egg crates and has special reference to crates particularly adapted for the transmission of eggs through the mails.

The object of our invention is to provide a crate for the purpose mentioned which shall practically eliminate the breakage of eggs in transit even though the crate is not handled with particular care and to provide a crate having a handle so arranged and secured that when in place it automatically locks the cover of the crate against being opened.

Other features of advantage and convenience will be made clear by the following description taken in conjunction with the accompanying drawings forming part of this specification, and in which :—

Figure 1 is a top plan view of a crate made in accordance with our invention;

Figure 2 is a vertical transverse section on the line 2—2 of Figure 1;

Figure 3 is a fragmentary top plan view with the cover removed;

Figure 4 is a fragmentary view particularly illustrating the connection of the handle with the bail; and Figure 5 is a vertical sectional view on the line 5—5 of Figure 1.

In said drawings, 1 represents a casing which in the form shown is cylindrical. The casing is closed at its lower end by a fixed bottom 2 and at its upper end by a removal cover 3.

Resting on or supported by the bottom is a horizontal support 4 in the form of a cross supported at the end of each arm by means of a compression spring 5 secured to the support 4 by fastening means 6. The lower ends of the springs contact with the bottom 2 of the casing. Resting on the support 4 is a cellular egg container 7 comprising a tray-like member having a circular side wall 8 and a woven wire bottom 9. A second cellular container 10 may be placed above the first container and it is similar in form. Obviously the casing 1 may be made high enough to contain more than the two cellular containers shown. Above the container 10 we arrange a transverse flat member 11 similar to the supporting member 4 and provided with a spring 12 arranged between each of its ends and the cover 3. These springs are secured to the member 11 by fasteners 13.

Each of these containers comprise a plurality of cylindrical cells 14 which are fastened together by any suitable means as by wires 15 which connect adjacent cells together. Each of the cylindrical cells 14 is adapted to contain a single egg. Between these trays and covering the upper tray we preferably provide sheets of paste-board 16 and preferably the woven wire bottom of the tray is spaced above the lower edge of the side wall and rests upon a peripheral shoulder 17 as best shown in Figure 2. The trays are circular to conform with the circular casing. We also provide removable paste-board bottoms 9′ which cover the woven wire bottoms and upon which the eggs rest.

The upper end of the casing is strengthened by an external circumferential flange or hoop 18 and the cover 3 is provided with a depending circumferential flange 19 which fits just outside of the strengthening loop 18. The spring supports and the containers are so proportioned as to height that it is necessary to compress the springs 5 and 12 to fully enter the cover 3 upon the casing.

To hold the cover tightly in place, we provide a bail 20 comprising two parts 21 and 22. Each part of the bail has a horizontal inturned lower end 23 adapted to enter through a suitable opening in a sheet metal connecting plate 24 secured to the outside surface of the casing just below the lower edge of the rim 19 on the cover. Each part of the bail has a vertical portion 25 of such a length that the main part of the bail can be arranged above the cover and in contact therewith and will hold the cover pressed down tightly upon the casing. The free end of the part 21 of the bail is provided with a vertically standing loop 26 and the free end of the part 22 of the bail is provided with a cooperating loop 27 which is arranged horizontally and which is adapted to be sprung over the loop 26 and interlock the two parts of the bail together. These interlocking loops are arranged offset from the center of the casing sufficiently so that we can arrange a second loop 28 in the part 21 of the bail and equally spaced from the center and to which two loops of the part 21 we can connect a handle member 29 and have the handle centrally located. For connecting the handle 29 to the bail we provide a wire connecting member 30 having a loop 31 permanently connected to the loop 28 of the member 21 and having at its opposite end a loop 32 to which an ordinary spring snap 33 may be connected, the snap portion being adapted to be removably connected to the loop 26 for removably connecting the handle 29 to the egg crate. The snap when in place in the loop 26 prevents the loop 27 from escapement from the loop 26 and consequently locks the bail upon the casing and the bail locks the cover 3 upon the casing.

The connected cylindrical cellular egg container can be removed as a whole from each tray to facilitate the removal of the eggs.

While we have shown cellular members, for receiving the eggs, of a peculiar and improved construction, it is obvious that many details of our invention are not limited to use with these specific egg containers. It is to be noted that the cellular containers are spring supported and the danger of breakage of the eggs is minimized.

As many modifications of our invention will readily suggest themselves to one skilled in the art we do not limit or confine our invention to the specific details of construction herein shown and described.

We claim:

1. An egg crate comprising a casing having a removable cover, a spring supported transverse member in the lower part of the casing and a similar member in the top of the casing, the springs adapted to contact with the ends of the casing, a series of cellular sections arranged in a stack between the two flat members, and each of the cellular sections comprising a shallow tray, the tray substantially filled with vertical tubular members each adapted to contain one egg.

2. An egg crate comprising a casing, a cover for the casing having a peripheral flange fitting the top of the casing, and a bail comprising two parts adapted to engage the casing at the sides and to interlock above the cover, and a securing member adapted to removably lock the two parts of the bail, as and for the purpose specified.

3. A cellular section for use in an egg crate in association with one or more similar trays comprising a tray-like member, and a plurality of cylindrical cells secured, each cell having a circumferentially continuous wall whereby it does not laterally press an egg contained therein, in the vertical position in the tray, the cells and marginal wall of the tray being substantially equal in height.

4. An egg crate circular in horizontal cross-section, a cover for the crate having a peripheral flange fitting the body of the crate, a two piece bail each piece removably engaging the side wall of the body below the flange at one end and adapted to be arranged over the cover, the two parts of the bail having inter-engaging ends free of the cover and one thereof having a loop through which a handle member can be attached to lock the two parts in engagement and to lock the cover on the casing, as and for the purpose specified.

5. In an egg crate, a tray-like member having a bottom which is yielding downwardly as a whole, and a plurality of open bottom cells in the tray each of a size to receive a single egg.

6. In an egg crate a tray-like member having a yielding bottom of woven wire and a plurality of open bottomed cells for placement in the tray, each cell adapted to hold a single egg.

7. In an egg crate, a tray-like member having a woven wire bottom, which is yielding as a whole, and a plurality of open bottomed cylindrical cells, each adapted to contain a single egg, the several cells connected together into a unit for convenience in removing same from the tray.

8. In an egg case having a cover member fitting upon the case, a bail for the case comprising two members each having an end pivoted to the case, and having parts adapted to overlie the cover, the free ends of the bail having interengaging loops, a handle member permanently secured to one of the parts of the bail between its ends, one of said loops on the parts of the bail adapted to receive the other end of the handle member and whereby the two parts of the bail are locked together free of the cover.

9. In a device of the kind described, a case having a cover fitting same, a two part bail, an end of each pivotally connected to the side of the case, and a handle member permanently pivotally secured at one end to one of the parts of the bail and adapted to be removably connected at its other end to said bail at its opposite end as and for the purpose specified.

Signed at Chicago, Illinois, this 19th day of July, 1921.

ERNEST F. WILLMANN.
WILLIAM KUERSTEN.